(12) United States Patent
Zimbone et al.

(10) Patent No.: US 7,112,129 B2
(45) Date of Patent: Sep. 26, 2006

(54) SHELLFISH CRACKING DEVICE

(76) Inventors: Paul J. Zimbone, 1 River Rd., P.O. Box 443, Waterville Valley, NH (US) 03215; Tamsin Zimbone Hewes, 2 Emerald Dr., Derry, NH (US) 03038

( * ) Notice: Subject to any disclaimer, the term of this patent is extended or adjusted under 35 U.S.C. 154(b) by 144 days.

(21) Appl. No.: 11/013,815

(22) Filed: Dec. 16, 2004

(65) Prior Publication Data
US 2006/0154584 A1 Jul. 13, 2006

(51) Int. Cl.
*A22C 29/02* (2006.01)

(52) U.S. Cl. .......................................... 452/6

(58) Field of Classification Search ........ 452/102–106, 452/2–6; 81/426, 426.5; 7/132, 134, 135; 99/552, 553, 564, 565, 581, 567, 568, 577, 99/578; 30/120.1–120.5
See application file for complete search history.

(56) References Cited

U.S. PATENT DOCUMENTS

| | | | | |
|---|---|---|---|---|
| 129,506 A * | 7/1872 | Woodville | .................... | 81/426 |
| 371,639 A * | 10/1887 | Taylor | ........................ | 227/144 |
| 383,970 A * | 6/1888 | McHenry et al. | ............... | 7/117 |
| 404,811 A * | 6/1889 | Wichelhaus | .................... | 86/40 |
| 966,269 A * | 8/1910 | Underwood | ............... | 30/120.1 |
| 1,219,857 A * | 3/1917 | Parkhurst | ....................... | 452/6 |
| 1,294,404 A * | 2/1919 | Conley | ........................... | 7/132 |
| 2,090,341 A * | 8/1937 | Burnham | ................... | 30/120.3 |
| 2,434,550 A * | 1/1948 | Daniel | ......................... | 43/53.5 |
| 2,778,254 A * | 1/1957 | Carapellotti | ................. | 81/3.56 |
| 2,783,483 A * | 3/1957 | Seher | ............................. | 7/107 |
| 3,685,097 A * | 8/1972 | Scott et al. | ................... | 452/17 |
| 4,103,395 A | 8/1978 | Latorella | ....................... | 17/71 |
| 4,519,136 A * | 5/1985 | Walker | ......................... | 30/142 |
| 4,716,627 A * | 1/1988 | Scott, Jr. | ........................ | 452/6 |
| 5,193,336 A * | 3/1993 | King | .................................. | 59/7 |
| 5,351,585 A * | 10/1994 | Leseberg et al. | .............. | 81/426 |
| 6,019,673 A | 2/2000 | Saizon | .......................... | 452/6 |
| 6,129,622 A * | 10/2000 | Seaman et al. | ................ | 452/6 |

* cited by examiner

*Primary Examiner*—Thomas Price
(74) *Attorney, Agent, or Firm*—Barlow, Josephs & Holmes, Ltd.

(57) ABSTRACT

A shellfish cracking device for cracking shellfish such as lobster and crabs is provided. The shellfish cracking device includes a first cracking member having a first handle portion, middle portion, and blade portion; and a second cracking member having a second handle portion, middle portion, and blade portion. The first blade portion has a substantially concaved surface, and the second blade portion has a substantially rounded surface which engage each other to crack the shell. The second blade portion has a substantially linear, tapered cutting edge for cracking the shell forcefully and cleanly.

13 Claims, 3 Drawing Sheets

SHELLFISH CRACKING DEVICE

BACKGROUND OF THE INVENTION

The present invention generally relates to a device for cracking shellfish. Particularly, this invention relates to a scissors-like device for cutting shellfish such as lobster and crabs sharply and cleanly.

Many people in ocean communities and elsewhere enjoy eating shellfish such as lobsters and crabs. Shellfish can be enjoyed in a wide variety of settings. People like to order shellfish in restaurants, prepare shellfish meals in the home, or attend outdoor lobster/crab bakes. Eating the meat of shellfish often involves a difficult first step of cracking and opening the shells. Then, the meat must be picked out of the cracked shells carefully to avoid ingesting splintered shell pieces. People use various utensils such as knives, nutcrackers, forks, and small hammers in this rather complex operation, but such utensils frequently are ineffective. It is often hard to grasp the claws, lobster tails, and other shell pieces with these common utensils. The wet shell sections tend to slip and slide off the utensils. Once the shells finally are gripped so that they may be cracked, the shells may not break easily or cleanly. The pieces of the shell, water and seafood will splatter everywhere during the cracking step. Some shellfish fans enjoy this part of the shellfish eating experience and view extracting seafood from the shell as an exciting challenge. Other people enjoy eating shellfish but would like to do so in a more refined and less exasperating manner.

Various shellfish cracking tools are known in the art to assist in the cracking of shells and eating of shellfish meat. For example, Saizon, U.S. Pat. No. 6,019,673 discloses a utensil for cracking the shells of crabs, lobsters, and other shellfish. The Saizon utensil includes a pair of handles that are pivotally connected. Each handle has a jaw with a tapered cutting edge for cracking the shells. The handles are bent in such a way as to prevent complete closure of the jaws, so that the shell is cracked while leaving the meat of the shellfish intact.

Scott, Jr., U.S. Pat. No. 4,716,627 discloses a plier-like tool for cracking and opening crab claws. The tool has jaws with concaved portions for gripping and cracking the crab claws. The end of the tool has a curved needle nose portion with teeth thereon for picking out the exposed meat.

Walker, U.S. Pat. No. 4,519,136 discloses a shellfish cutting and eating implement having first and second lever members pivotally connected together. The first lever member includes a jaw portion and a flared end to keep the jaw in the proper position during the cutting operation. The flared end also defines a pointed forward end, in the shape of a fork, to facilitate spearing and removal of the shellfish meat. The second lever member includes a jaw portion which defines a notched cutting edge.

Latorella, U.S. Pat. No. 4,103,395 discloses a shellfish tool comprising first and second lever units pivotally connected to each other. Each lever unit comprises an elongated handle portion, a shoulder portion, and an elongated jaw portion. The handle portions are provided with cracker sections which can be used to crack the shells. The tool also includes a spring means which biases the first and second lever units so that the jaw portions are engaged with each other and the handle portions are removed from each other. In another step, The handle portions move toward one another against the pressure of the spring to cause the jaw portions to separate.

Although some conventional shellfish cracking tools can be effective in cracking some shells, there is still a need for an improved cracking device that cracks and cuts-through hard shells cleanly and efficiently. The desired shellfish cracking device should be capable of holding the shell tightly so that it does not slip during the cracking step. The present invention provides such a shellfish cracking device. These and other objects, features, and advantages of this invention are evident from the following description and attached figures.

SUMMARY OF THE INVENTION

The present invention relates to an improved shellfish cracking device. The cracking tool comprises: a) a first cracking member having a first handle portion, middle portion, and blade portion, and b) a second cracking member having a second handle portion, middle portion, and blade portion. The first blade portion has a substantially concaved surface, and the complementary second blade portion has a substantially linear, tapered surface. The surface of the second blade portion has an angular cutting edge. The angular cutting edge of the second blade can cut the shell sharply and cleanly as it is pressed against the first blade holding the shell. More particularly, the first and second cracking members are pivotally attached to each other so that when a force is applied thereto, the members pivot and the first blade portion and second blade portion move towards each other and crack the shell. When the first and second blade portions are in a substantially engaged, closed position, the blades form a half circle-like shaped cavity for gripping and cracking the shell.

In one embodiment, the middle portion of the second cracking member can comprise teeth for holding a shell. The shell gripping teeth are spaced apart by V-shaped notches. When force is applied to the first and second cracking members, the complementary middle portion of the first cracking member and gripping teeth in the second cracking member move towards each other so that the shell is cracked. The inner edge of the complementary middle portion of the first cracking member can be angular so that it defines a sharp cutting edge. Thus, the inner cutting edge can cut the shell sharply and cleanly as it is pressed against the gripping teeth holding the shell.

In addition, the middle portion of the second cracking member can have a cut-out, recessed area for holding a shell. In operation, when force is applied to the first and second cracking members, the complementary middle portion of the first cracking member and the recessed area in the second cracking area move towards each other so that the shell is cracked. Also, the inner edge of the complementary middle portion of the first cracking member can be angular so that it defines a sharp cutting edge. With this sharp inner cutting edge, the middle portion of the first cracking member can cut the shell sharply and cleanly as it is pressed against the recessed area of the second cracking member.

The handle portion of the first cracking member can have a through hole for inserting a thumb, and the handle portion of the second cracking member can have an opposing through hole for inserting fingers to grip the cracking tool.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENTS

Figure 1:
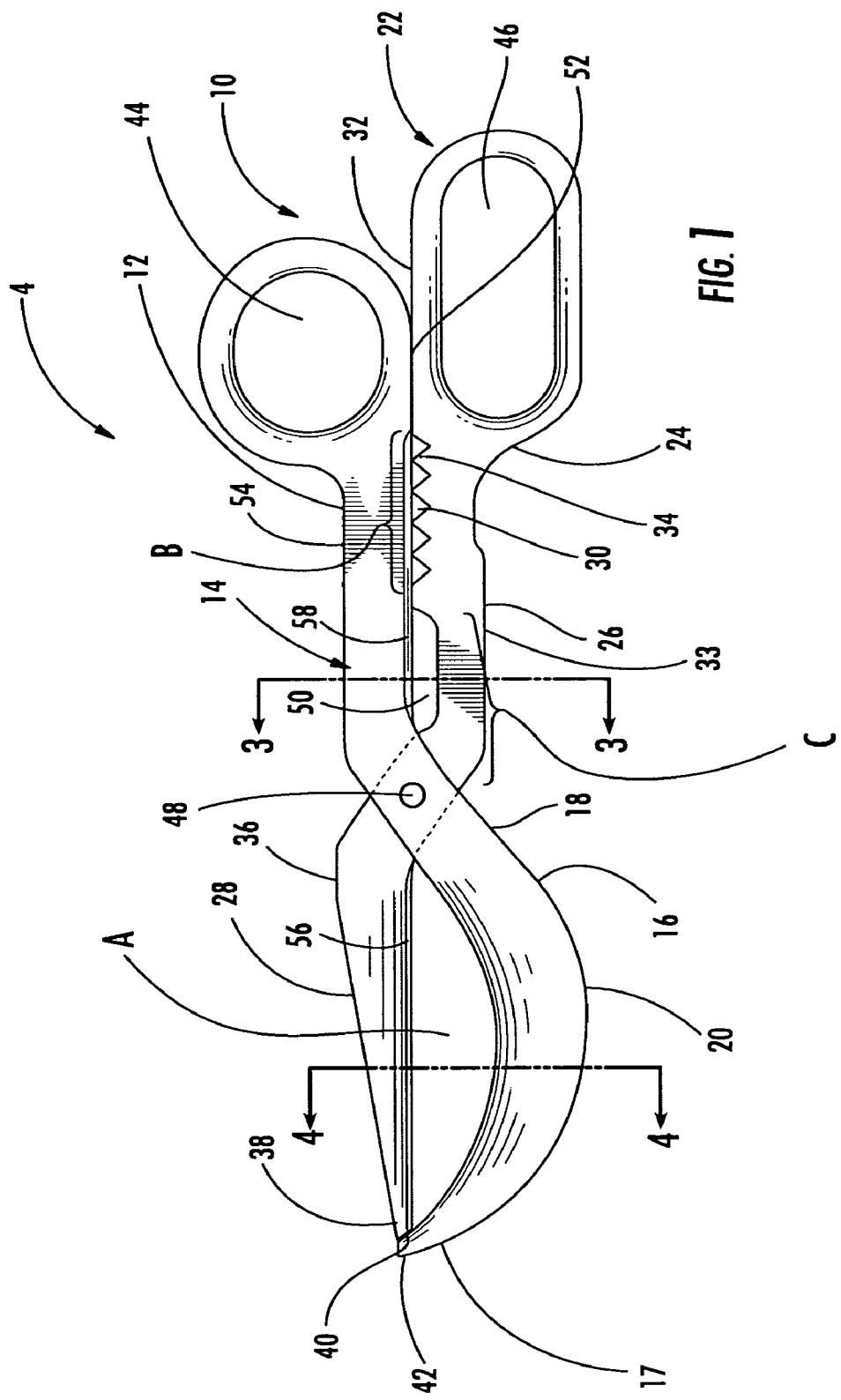
FIG. 1 is a side perspective view of one embodiment of the shellfish cracking device of the present invention showing the blade portions of the first and second cracking members in a closed, engaged position.

Referring to FIG. 1, the shellfish cracking device of this invention is generally indicated at 4. The first cracking member 10 of the shellfish cracking device 4 comprises a first handle portion as generally indicated at 12, first middle portion generally indicated at 14, and a first blade portion generally indicated at 16. The blade portion 16 defines a lower substantially concave surface for holding a shell (not shown) in place. The proximal 18 and center 20 portions of the curved blade 16 are relatively wide as shown in FIG. 1. The width of the blade 16 then tapers off and the distal portion 17 is relatively narrow. With this tapered end 17, the curved blade 16 can be inserted smoothly under the shell so that the shell rests in the curved recess of the blade portion 16. The substantially concaved inner surface of the blade 16 retains the shell and keeps it from slipping and sliding off the shellfish cracking device 4. The concaved inner surface of the blade 16 is also used in cracking and opening the shell as discussed further below.

The second cracking member 22 includes a second handle portion as generally indicated at 24, second middle portion generally indicated at 26, and second blade portion generally indicated at 28. The blade portion 28 defines a substantially linear, tapered surface for cracking the shell as force is applied to the cracking members 10 and 22, and the blade 16 of the first cracking member 10 and blade 28 of the second cracking member 22 move towards each other. The proximal portion 36 of the second blade 28 is relatively wide as shown in FIG. 1. The width of the second blade 28 then tapers off and the distal portion 38 is relatively narrow. The tip 40 of the second blade 28 is beveled so that it can contact the inner surface of the tip 42 of the first blade 16. When brought completely together, the complementary first and second blades 16 and 28 form a half circle-like shaped cavity for holding and cracking the shell as shown in FIG. 1.

Figure 2:
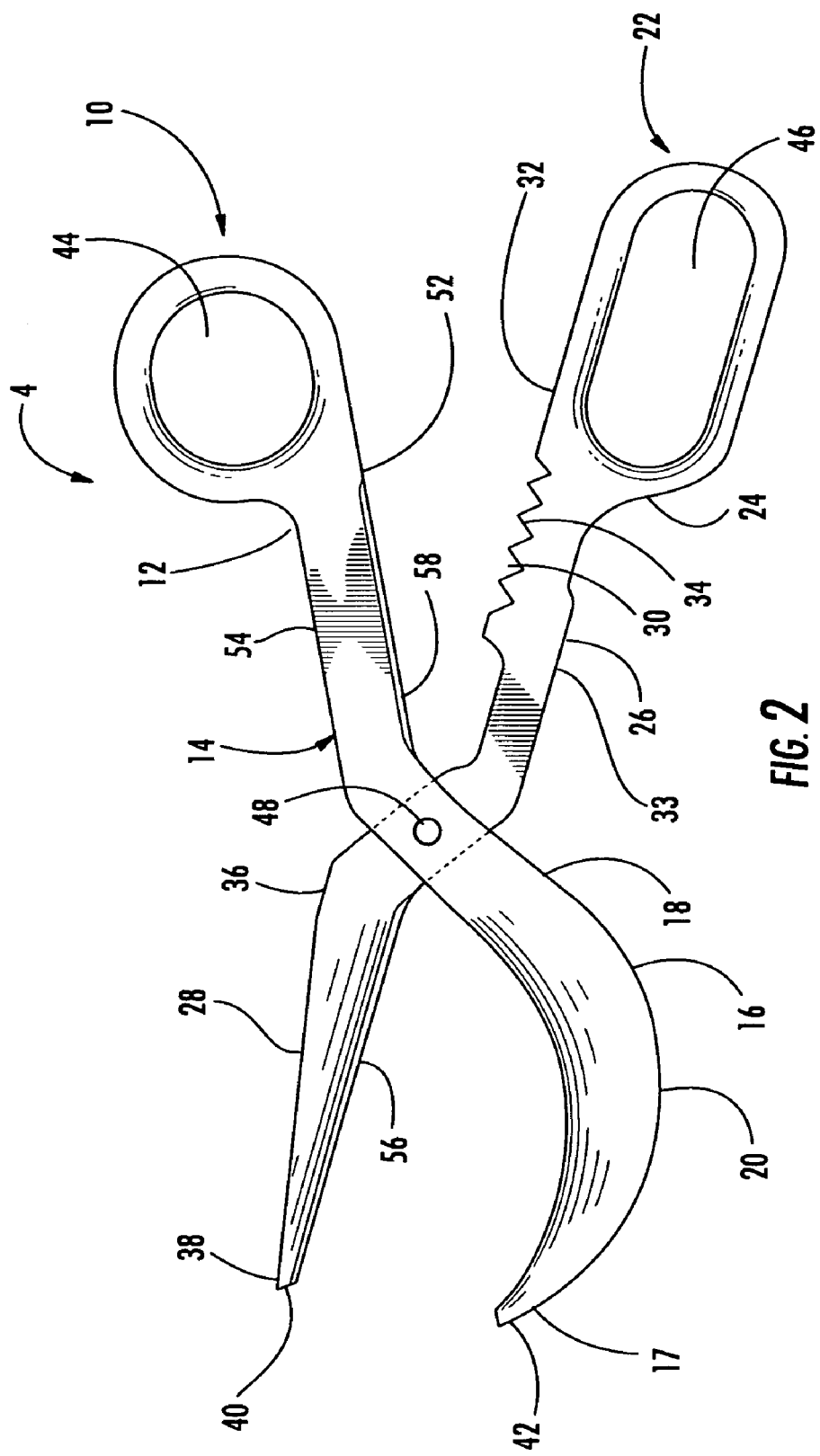
FIG. 2 is a side perspective view of the shellfish cracking device of FIG. 1 showing the blade portions of the first and second cracking members in an open, disengaged position.

In one embodiment of the shellfish cracking device 4, the middle portion 26 of the second cracking member 22 can comprise a series of V-shaped notches 30 located in its inner edge 32 as shown in FIGS. 1 and 2. The outer edge of the second cracking member is indicated at 33. A series of teeth 34 for gripping the shell are spaced apart by the V-shaped notches 30. When force is applied to the first and second cracking members 10 and 22, the shell gripping teeth 34 and inner edge 52 (FIG. 2) of the first cracking member 10 are pressed together to crack the shell. The outer edge of the first cracking member 10 is indicated at 54. It is understood that other embodiments of the shellfish cracking device 4 can be used, wherein the inner edge 32 does not contain shell gripping teeth 34. For example, the inner edge 32 may be generally flat, and this flat edge may be pressed against the inner edge 52 of the first cracking member 10 to crack the shell.

In further embodiments of the shellfish cracking device 4 of this invention, the middle portion 26 of the second cracking member 22 contains a cut-out, recessed area 50 for holding a shell. Referring to FIG. 1, this recessed area 50 is adjacent to the V-shaped notches 30. When force is applied to the first and second cracking members 10 and 22, the recessed area 50 and inner edge 52 move towards each other to crack the shell.

Figure 4:
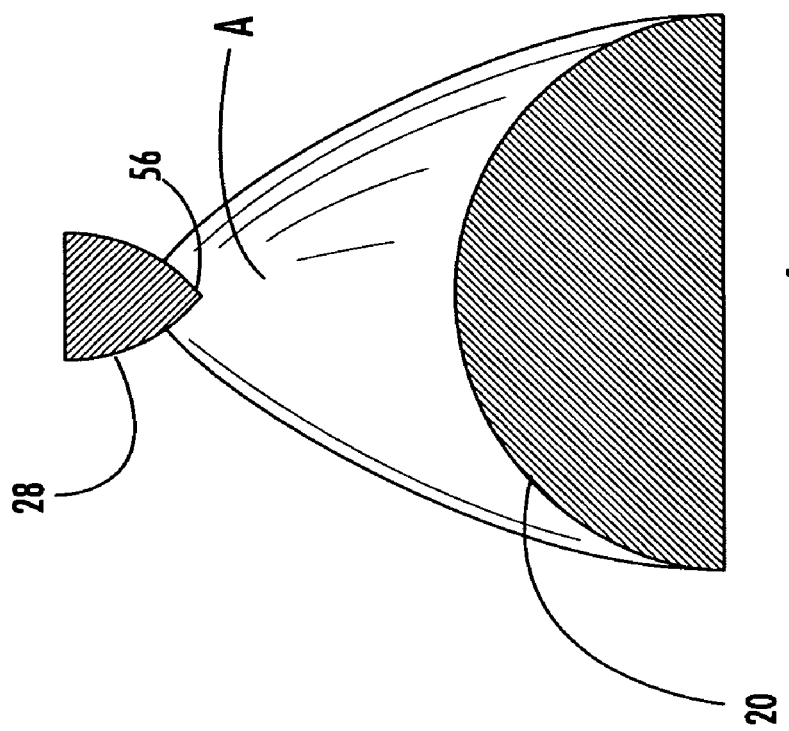
FIG. 4 is a cross-sectional view through Line 4—4 of FIG. 1.
Figure 3:
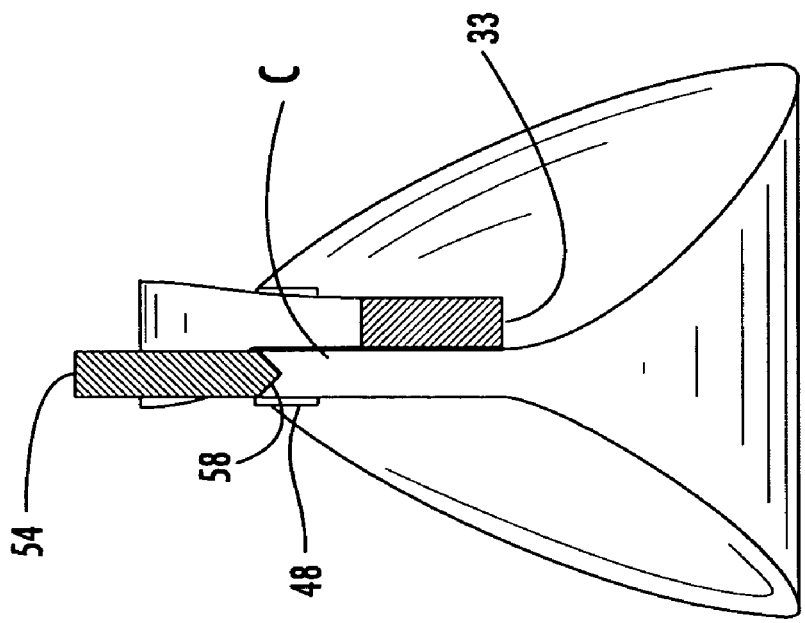
FIG. 3 is a cross-sectional view through Line 3—3 of FIG. 1.

Referring now to FIG. 3, a cross-sectional view of Line 3—3 in FIG. 1 is shown. As illustrated in FIG. 3, the inner edge 52 of the first cracking member 10 has an angular cutting edge 58. In FIG. 4, a cross-sectional view of Line 4—4 in FIG. 1 is shown. As shown in FIG. 4, the blade portion 28 of the second cracking member 22 also has an angular cutting edge 56. In FIGS. 3 and 4, the angular cutting edge 58 and angular cutting edge 56 each are shown defining an angle of about forty-five (45) degrees, but it should be understood that these angle dimensions are for illustration purposes only, and it is not necessary that the cutting edges 58 and 56 be angled at 45 degrees. The cutting edges 58 and 56 may be configured at any suitable angle that provides the edges 58 and 56 and with a sharp knife-like structure so that they can cut a shell sharply and cleanly.

The end of the handle portion 12 of the first cracking member 10 can have a through hole 44, wherein a person can insert his or her thumb. Also, the end of the handle portion 24 of the second cracking member 22 can have an opposing through hole 46 for inserting two or three fingers of the hand. In this manner, a person can grip the shellfish cracking device 4 firmly and apply sufficient force to crack the shell.

The first and second cracking members 10 and 22 are pivotally attached to each other by a pivot pin 48 or other fastening means that is inserted through holes in the first and second cracking members. The cracking members 10 and 22 can be made from stainless steel, ceramic, plastic or other suitable material. The pivot pin 48 can be removed and the cracking members 10 and 22 can be pulled apart from each other if desired. Then, each cracking member 10 and 22 can be scrubbed and washed. Germ and bacterial build-up on the cracking members can be prevented in this manner. The device 4 can be reassembled easily after this cleaning step.

The shellfish cracking device 4 of this invention can be used easily to effectively grip and crack various shells. As discussed above, the cracking device 4 has three distinct cracking areas. The shell can be placed in different cracking areas of the cracking device 4 depending on the size, thickness, hardness and the shell.

The first and second blade portions 16 and 28 constitute a first cracking area designated as "A" in FIG. 1. The curved blade 16 of the first cracking member 10 is shaped to hold the shell in place and prevent it from slipping. The complementary second blade 28 of the second cracking member 22 is shaped to help hold the shell and engage the first cracking member 10 in a cracking action. The cracking members 10 and 22, working in combination, grip and crack the shell forcefully and cleanly. The first and second cracking members 10 and 22 are pivotally attached to each other so that when a force is applied thereto, the members pivot and the first blade portion 16 and second blade portion 28 move towards each other to crack the shell. When the first and second cracking members 10 and 22 are in a substantially engaged position, the blades 16 and 28 form a generally closed cavity having a substantially half-circle shape as shown in FIG. 1.

The unique design of the shellfish cracking device 4 of this invention allows a pressure of 1000 psi or greater to be applied to the shell so that even extremely thick shells can be cracked cleanly. Further, since the blade portions 16 and 28 of the cracking members 10 and 22 have smooth surfaces with no jagged edges or teeth, the shell tends not to shatter into small splinters or slivers when it is cracked. Also, as discussed above, the blade portion 28 of cracking member 22 has an angular and tapered cutting edge 56. This angular and tapered cutting edge 56 helps cut the shell forcefully and cleanly as the blades 28 and 16 are brought together in the cracking action.

The series of V-shaped notches 30 and shell gripping teeth 34 in the inner edge 32 of the second cracking member 22 in combination with the angular cutting edge 52 of the first cracking member 10 can be considered to form a second cracking area designated as "B" in FIG. 1. The inner cutting edge 52 can be used to cut hard shells against the gripping teeth 34 of the second cracking member 22. In operation, when force is applied to the first and second cracking members 10 and 22, the shell gripping teeth 34 and complementary inner edge 52 of the first cracking member 10 are pressed together to crack a shell that is positioned between the gripping teeth 34 and inner edge 52. Also, as discussed above, the inner edge 52 has an angular cutting edge 58. This angular cutting edge 58 helps cut the shell forcefully and cleanly as force is applied and the inner edge 52 of the first cracking member 10 and the gripping teeth 34 are forced together.

In addition, the middle portion of the second cracking member 22 can have a cut-out, recessed area 50 that can be used for holding and cracking shells. This concave-shaped recess 50 can hold the shell in a manner similar to the curved blade portion 16. In operation, the curved area 50 and the complementary inner edge 52 of the first cracking member 10 move towards each other as force is applied to the cracking members 10 and 22. Referring to FIG. 1, this cracking area is generally designated as cracking area "C." The shell positioned in the recessed area 50 is cracked by the action of the inner edge 52 being pressed towards the recessed area 50 holding the shell. Also, as discussed above, the inner edge 52 has an angular cutting edge 58. This angular cutting edge 58 helps cut the shell forcefully and cleanly as the inner edge 52 of the first cracking member 10 and the recessed area 50 are pressed together in the cracking step.

The shellfish cracking device of the present invention offers many advantageous features. For example, the handle portions are easy to grip, and the device has multiple sections suitable for cracking shells. The cracking members control movement of the shell and prevent it from slipping off the device. Further, the cracking members engage each other in a tightly conforming manner to cut the shellfish sharply and cleanly. The angular cutting edges 56 and 58 help cut the shell forcefully and precisely so that the shell tends not to shatter into small splinters or slivers when it is cracked. Thus, the cracking device can be used to effectively crack and cut-open shells of various sizes, shapes, and hardness.

It is appreciated by those skilled in the art that various other changes and modifications can be made to the illustrated embodiments and description herein without departing from the spirit of the present invention. All such modifications and changes are intended to be covered by the appended claims.

What is claimed is:

1. A shellfish cracking device, comprising:
   a first cracking member having a first handle portion, a first middle portion, and a first blade portion, the first blade portion having a substantially concaved cracking surface, and
   a second cracking member having a second handle portion opposite said first handle portion, a second middle portion opposite said first middle portion, and a second blade portion opposite said first blade portion, the second blade portion having a substantially linear, tapered cracking surface,
   said concaved cracking surface and said linear cracking surface of said opposed first and second blade portions forming a cracking cavity having the shape of a circle segment,
   said first and second cracking members being pivotally attached to each other at a pivot point defined between said first and second blade portions and said first and second middle portions, and being pivotably movable between an open position a closed position such that when a closing force is applied to said first and second handle portions, the first and second blade portions and the first and second middle portions move toward each other for cracking a shell positioned therebetween.

2. The shellfish cracking device of claim 1, wherein the second middle portion of the second cracking member comprises shell gripping teeth for gripping and cracking a shell positioned between the cracking teeth and the first middle portion of the first cracking member as the first and second cracking members are forced towards each other.

3. The shellfish cracking device of claim 2, wherein the shell gripping teeth are spaced apart by V-shaped notches.

4. The shellfish cracking device of claim 2, wherein the first middle portion of the first cracking member has an angular cutting edge which engages the gripping teeth to crack the shell.

5. The shellfish cracking device of claim 1, wherein the second middle portion of the second cracking member comprises a cut-out, recessed area for gripping and cracking a shell positioned in the recessed area as the first and second cracking members are forced towards each other.

6. The shellfish cracking device of claim 5, wherein the first middle portion of the first cracking member has an angular cutting edge which engages the cut-out, recessed area to crack the shell.

7. The shellfish cracking device of claim 1, wherein the first handle portion of the first cracking member comprises a through hole for inserting a thumb, and the second handle portion of the second cracking member comprises an opposing through hole for inserting fingers.

8. The shellfish cracking device of claim 1, wherein the first and second cracking members are pivotally attached to each other by means of a pivot pin.

9. The shellfish cracking device of claim 1, wherein the first blade portion of the first cracking member has a proximal portion and a distal portion, the proximal portion having a width greater than the distal portion.

10. The shellfish cracking device of claim 1, wherein the second blade portion of the second cracking member has a proximal portion and a distal portion, the proximal portion having a width greater than the distal portion.

11. The shellfish cracking device of claim 10, wherein the second blade portion of the second cracking member has a beveled tip at its distal portion.

12. The shellfish cracking device of claim 1 further having a longitudinal axis extending from said handle portions toward said blade portion, said concaved cracking surface of said first blade portion having a convex shape extending transversely to said longitudinal axis.

13. The shellfish cracking device of claim 12 wherein linear cracking surface of said second blade portion has a longitudinal cutting edge.

* * * * *